United States Patent
Ligozat et al.

(10) Patent No.: US 7,675,014 B2
(45) Date of Patent: Mar. 9, 2010

(54) IMAGE SENSOR HAVING LINEAR ABUTTING BARS

(75) Inventors: Thierry Ligozat, Grenoble (FR); Bruno Gili, Grenoble (FR)

(73) Assignee: E2V Semiconductors (FR)

( * ) Notice: Subject to any disclaimer, the term of this patent is extended or adjusted under 35 U.S.C. 154(b) by 918 days.

(21) Appl. No.: 10/562,474

(22) PCT Filed: Jun. 25, 2004

(86) PCT No.: PCT/EP2004/051239

§ 371 (c)(1),
(2), (4) Date: May 1, 2006

(87) PCT Pub. No.: WO2005/002208

PCT Pub. Date: Jan. 6, 2005

(65) Prior Publication Data

US 2006/0238631 A1 Oct. 26, 2006

(30) Foreign Application Priority Data

Jun. 27, 2003 (FR) .................................. 03 07830

(51) Int. Cl.
*H01L 27/00* (2006.01)
*H04N 5/335* (2006.01)
(52) U.S. Cl. ...................... 250/208.1; 257/724; 348/294
(58) Field of Classification Search .............. 250/208.1, 250/214.1; 257/443, 724, 773, 784; 348/294, 348/295, 332
See application file for complete search history.

(56) References Cited

U.S. PATENT DOCUMENTS

| 4,987,477 A | | 1/1991 | Ikeno |
| 5,691,760 A | * | 11/1997 | Hosier et al. ................. 347/238 |
| 7,335,869 B2 | * | 2/2008 | Kochi ....................... 250/208.1 |

FOREIGN PATENT DOCUMENTS

JP 60086963 5/1985

OTHER PUBLICATIONS

Patent Abstract of Japan vo. 0092 No. 34 (E-344), Sep. 20, 1985 & JP 60086963A (Ricoh KK), May 16, 1985.

* cited by examiner

*Primary Examiner*—Kevin Pyo
(74) *Attorney, Agent, or Firm*—Lowe Hauptman Ham & Berner, LLP

(57) ABSTRACT

The invention relates to large-dimension linear image sensors operating by relative translation between the image and the sensor and consisting of a plurality of linear arrays abutting in a staggered fashion. In order to improve the design of the sensor, according to the invention the arrays are mounted on packages whose upper surface has an elongate rectangular shape provided on two opposite sides of the rectangle with two extensions substantially covered by the ends of the array, two adjacent packages bearing against each other along a respective extension of each of them. The staggered arrangement prevents the blind zones, photosensitive points being present in the extensions, and the offset between the two rows of staggered chips is practically no greater than the width of the chips.

5 Claims, 5 Drawing Sheets

IMAGE SENSOR HAVING LINEAR ABUTTING BARS

FIELD OF THE INVENTION

The invention relates to the manufacture of large-dimension image sensors operating by relative translation between the image and the sensor. They are therefore linear sensors, that is to say sensors comprising one or more lines of photosensitive detectors and intended, during the relative translation between the image and the sensor, to reconstruct an overall image in two dimensions, namely one dimension in the direction of the line of photosensitive detectors and one dimension in the translation direction perpendicular to this line.

It will be understood that this definition includes linear array sensors with a plurality of lines, and in particular linear sensors of the TDI (Time Delay Integration) type which may comprise a plurality of lines, or even several tens of lines, intended to improve the signal/noise ratio of the detection by successive observation of a same image line by a plurality of detector lines.

BACKGROUND OF THE INVENTION

For particular applications, for example observation of the earth from satellites, it is desirable to produce linear sensors of great length, more than that which can be produced on a single silicon chip, and for this purpose a plurality of chips may be aligned end-to-end in the direction of their length.

FIG. 1 represents a top view of a row, on a printed circuit board 10, of a plurality of packages B1, B2, B3 . . . each carrying a respective semiconductor chip P1, P2, P3 . . . in the form of an array, each chip being electrically connected to its package by wires welded between connection terminals of the chip and connection terminals of the package.

The drawback of this layout is the presence of blind zones: even if the photosensitive points practically reach the edge of the chip and even if the chip practically reaches the edge of the package, the junction zones at the boundary between two chips will not contain photosensitive points (or pixels in image detection). In fact, the pixels will scarcely reach closer than about fifty micrometers from the edge of the chip, and the chip can only reach the edge of the package with a tolerance of the same order. For pixels having a pitch of about 10 micrometers, about ten pixels risk being absent in each abutment zone of adjacent packages. This is not acceptable because the overall image reconstructed in the course of the relative displacement of the sensor will comprise black columns in the translation direction.

FIG. 2 represents a lateral section of a solution which has already been attempted in order to resolve this drawback: the photographic optics project the image to be detected not directly onto the photosensitive sensor but onto the plane entry face of a set of optical fiber bundles F1, F2, F3 . . . ; the fiber bundles F1, F2, F3 are juxtaposed and leave no gap between them on the side of their entry face; each bundle is deformed by tightening the side turned toward the chip, however, so that its exit face occupies only the useful length of the linear array. The blind zones are thus eliminated. This solution is very expensive, in particular because of the extreme precision which is required in the juxtaposition of the fiber bundles and in the deformation of these bundles so that their exit occupies exactly the active photosensitive length of each array.

FIG. 3 represents a more practical solution which may be envisaged: the chips abut, although in a staggered fashion; they are therefore not aligned, or more exactly they are divided into two groups of aligned chips and the two groups form two parallel rows, each chip of the second group being placed between two separated chips of the first group but offset out of the row of chips of the first group. The distance between two chips of a row is less than the length of the package of a chip. The packages therefore bear against one another at the end, along an edge parallel to the row direction; the ends of the adjacent chips comprise detection zone portions in mutual overlap so that there is absolutely no dead zone. The separation of the row axes of the two groups is equal to the width L of the package. It is perfectly known and, when photographing in translation, taking into account the translation speed V, an image line is reconstructed by combining the information provided by two adjacent chips not at the same time but with a time interval L/V, which compensates for the fact that the chips do not see the same image line at the same time.

This solution suffers from drawbacks associated with the need to reconstruct the final image, with risks of distortion and instability which are commensurately more problematic as the distance between the two chip rows is greater. The distance is moreover equal to the width of the package, that is to say several centimeters.

One possible solution for limiting this drawback is represented in FIG. 4: the chips are all placed at the edge of the package, all the wires connecting the chip to the package being relocated to one side of the chip. The chips are still staggered, and the signal which they provide therefore has to be processed in order to carry out reconstruction, taking into account the offset of the row axis of the chips, although this offset is now practically only the width of the chip and no longer the width of the package.

Unfortunately, this solution is expensive because it requires a particular chip design, having connection terminals on only one side, and it may furthermore require the use of two different components depending on whether the chip belongs to one row or the other because the chips are alternately reversed; reversal, however, is not necessarily compatible with the operation of the chip. This is the case in particular for multilinear arrays operating in TDI (Time Delay Integration) mode, or multispectral imaging arrays having a plurality of lines of pixels corresponding to different colors or ranges of the spectrum. This is because reversal of the chip entails signal processing problems in both cases. This solution is therefore difficult to implement.

SUMMARY OF THE INVENTION

In order to further improve the staggered abutment, with mutual overlap of the photosensitive zones in order to avoid blind zones, the present invention principally relates to a sensor whose package, instead of being simply rectangular as is conventionally the case, comprises two small lateral extensions substantially with the same width as the chip and with a length substantially equal to the mutual overlap desired between the chips. These extensions extend in the length direction of the chip. The chip practically entirely covers these extensions (which do not contain connection terminals). The extensions of two packages are adjacent (in physical contact or almost in physical contact) via their side parallel to the row of chips. There is no connection terminal on the substrate in the region of the lateral extensions.

There is therefore a staggered abutment, with an inter-axial distance equal to the width of the chips or nearly so, without having the need to design a special component (this is because the terminals can lie on both sides of the chip) and without having the need for two different components, one for each of the rows, as is the case in the arrangement of FIG. 4.

The invention therefore relates to an image sensor comprising a plurality of linear image detection arrays associated in order to form a linear image sensor with a length greater than that of each array, characterized in that the arrays are mounted on packages whose upper surface has an elongate rectangular shape provided on two opposite short sides of the rectangle with two extensions substantially covered by the ends of the array, the packages being mounted in a staggered fashion and two packages being adjacent via a respective extension of each of them. These extensions have a width smaller than that of the short sides of the rectangle. There are no connection terminals on the packages, so that they can all be identical and juxtaposed without reversal.

A variant may nevertheless be envisaged in which the chips protrude from a rectangular package without extensions of this rectangular package supporting them. This variant is less favorable because it subjects the chips to stresses which are not always compatible with severe environmental conditions, particularly from the point of view of shocks and vibrations; on the other hand, the grounding of the chip on its entire rear face is inferior, as is the thermal dissipation.

In order to take account of these two possibilities according to the invention, the following general definition of the invention has been formulated: a large-dimension image sensor operating by relative translation of the image with respect to the sensor, comprising a plurality of individual monolithic chips each capable of detecting a linear image portion perpendicular to the translation direction, the individual chips being arranged in two groups, the chips of one group being aligned in order to detect aligned image portions and the chips of the other group being aligned in order to detect other image portions which are aligned but offset with respect to the chips of the first group in the relative translation direction, the chips of the second group being arranged in a staggered fashion with respect to the chips of the first group so that all the chips of the first group lie beside at least one chip of the second group, the chips each being mounted on a package, connection wires being connected between connection terminals of the package and connection terminals on the upper surface of the chip, characterized in that the upper surface of the package, on which the chip is mounted, comprises a principal zone the shape of which is an elongate rectangle whose length is less than the length of the chip and whose width is greater than that of the chip, all of the connection terminals lying inside this rectangle along the chip, all the chips having two ends protruding from the rectangle, a protruding end of a chip being adjacent, via a side parallel to the row of chips, to a side likewise parallel to the row of chips of the protruding edge of another chip. The packages are all identical and juxtaposed without reversal.

The chip end therefore protrudes according to the invention either into emptiness or on an extension of the package extending the rectangular zone in the general direction of the length of the rectangle.

In the embodiment with a rectangular package having two extensions lying under the chip protrusions, the dimension of these extensions, in length in the direction of the row and in width in the translation direction of the image, is preferably only just greater than the length and width of the protruding chip part which covers this extension. Only a positioning tolerance margin is provided, for example of the order of 50 to 100 micrometers, is provided around the chip in order to take into account risks of poorly positioning the chip on the package.

BRIEF DESCRIPTION OF THE DRAWINGS

Other characteristics and advantages of the invention will become apparent on reading the following detailed description, which is given with reference to the appended drawings in which.

DESCRIPTION OF PREFERRED EMBODIMENTS

Figure 5:
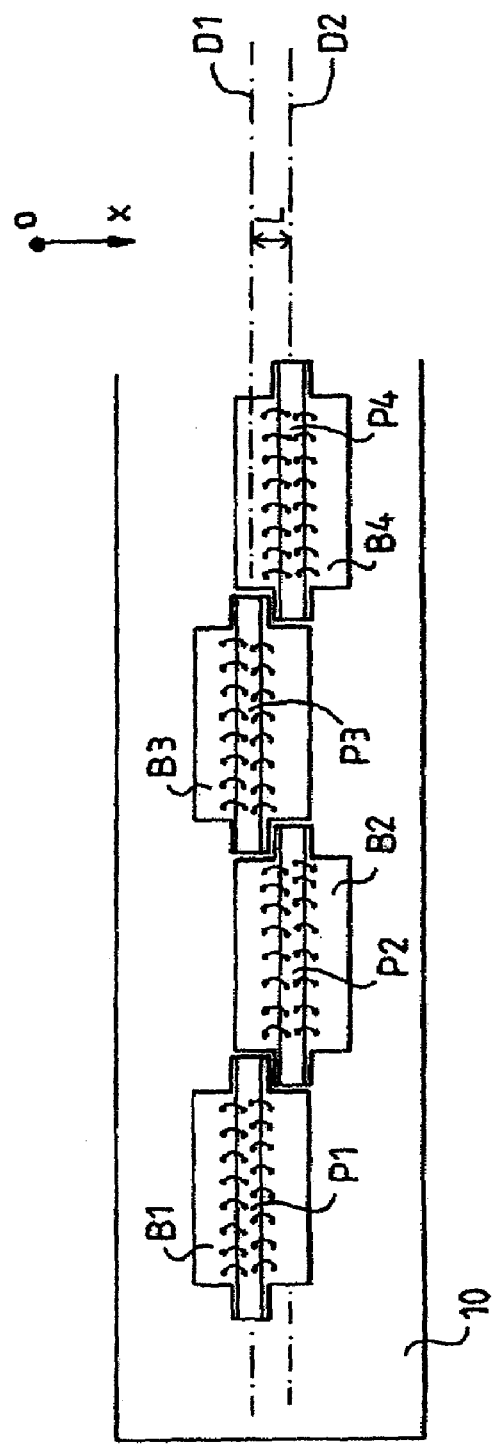
FIG. 5 represents a first possibility of the abutment of arrays according to the invention, having a package provided with two extensions and a chip covering these extensions.

FIG. 5 shows the linear sensor according to the invention, with a plurality of linear chips abutting in a staggered fashion with partial overlap between the ends of the chips. The staggered chips form two parallel rows, the axes of which are straight lines D1 and D2 parallel to the translation direction Ox of the image with respect to the sensor.

The first row comprises the odd rank linear chips P1, P3, etc., each carried by a respective package B1, B3, and the line passing linearly through the centre of the chips is the straight line D1. The second row comprises the even rank chips P2, P4 carried by the respective packages B2, B4 etc. and their central line is the straight line D2.

Figure 1:
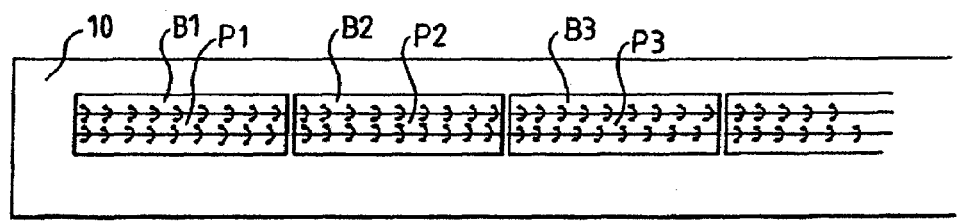
FIGS. 1 to 4, already described, represent various possibilities of mounting linear arrays in order to constitute a large-dimension sensor.
Figure 2:
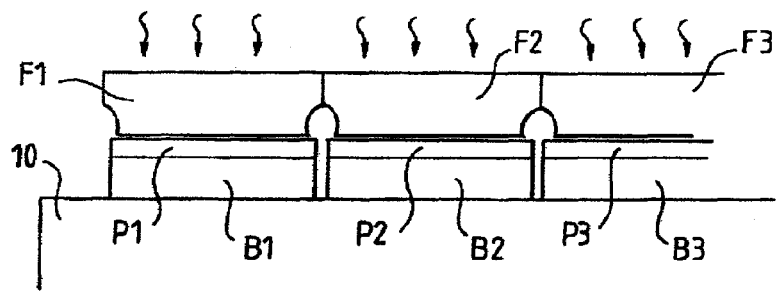
Figure 3:
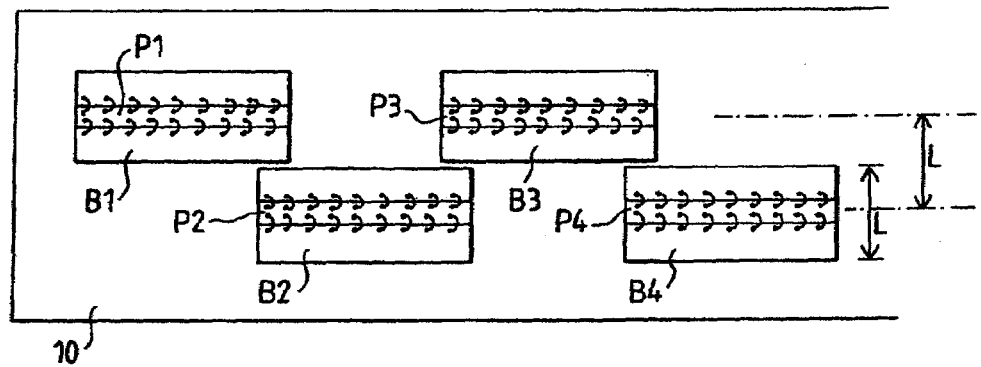
Figure 4:
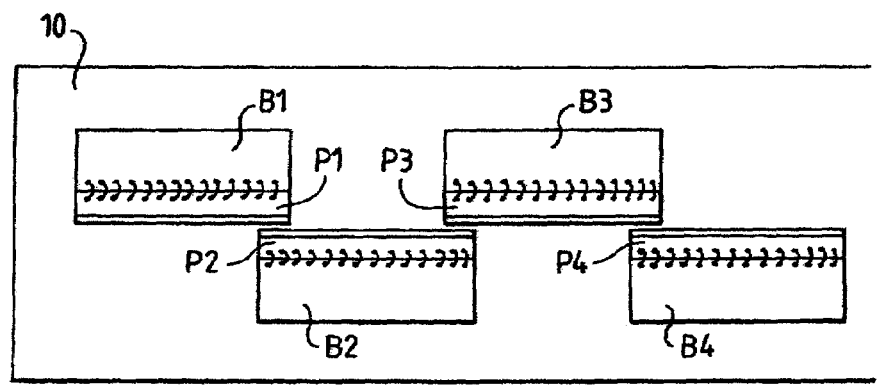

The straight lines D1 and D2 are separated by a distance L which is equal to or slightly greater (for example by 100 to 200 micrometers) than the width of the chips (the width counted along the direction Ox, for example equal to a few millimeters). This width is much less than that of the packages which support them (one or several centimeters), so that the spacing L of the straight lines D1 and D2 is much less than that which exists in FIG. 3. The chips are all identical and mounted identically on their package, in contrast to the case of FIG. 4.

The packages, all of which are identical, have an elongate overall shape since the chips are linear arrays (one line or several lines), and they therefore have two long sides parallel to the straight lines D1 and D2 and two short sides at the ends of these long sides. The short sides each comprise an extension or "lug" which extends the package in the direction of the straight lines D1 and D2. The chip mounted on a package essentially covers the upper surface of these extensions, although a slight margin (50 to 100 micrometers) may nevertheless be provided on all the edges of the extension so that the package protrudes beyond the surface of the chip in the region of the extension.

The staggered packages bear against one another via their extensions: the packages are in contact along edges parallel to the straight lines D1 and D2. On the other hand, the extension of a package may bear against a short side of the package wherever there is no extension.

The packages are therefore positioned very precisely with respect to one another so long as the dimensions (width and length) of the extensions are precisely machined.

Since the width of the extensions (in the translation direction Ox) is only just greater than the width of the chip, the connections between the chip and the package are produced exclusively in the principal zone of the upper surface of the package, and not in the extensions: there is no connection terminal on the upper surface of the package in the extensions.

In other words, the upper surface of the package has an elongate rectangular shape with two long sides and two short sides, and an extension protruding from the rectangle on each short side, and the connection terminals all lie inside the rectangle which constitutes the principal zone of the package, the extension constituting an auxiliary zone.

The staggered chips mutually overlap in the region of the extensions, that is to say the chip comprises useful photosensitive points in the region of the extensions, and the photosensitive points of an odd rank chip see a given image line slightly before the photosensitive points of an adjacent even rank chip see the same image line. If the translation speed is V and if the distance between the straight lines D1 and D2 is L, then the even rank line will see the same image line after a time L/V. In order to obtain an image in two dimensions during the image reconstruction, care will be taken to associate the signals provided at a time t by the odd rank chips with the signals provided by the even rank chips at time t+L/V.

The photosensitive points which are in mutual overlap make it possible to avoid having any blind zone in the line of arrays of photosensitive points: most of the points of an image line are seen by a single array, but the points are seen twice in the overlap zone, once at time t and once at time t+L/V; simple image processing makes it possible to give a single value to these points, which value may be the one read by one chip or the other chip, or the average of the two values read, optionally weighted as a function of the position of the point on the array.

The length of the extensions may correspond to the length necessary in order to place several tens of photosensitive points on the extension. With an array several centimeters long and photosensitive points with a pitch of 10 micrometers, for example, 1 millimeter extensions may be provided. In an example of a spatial imaging sensor, the length of the package may be 5 centimeters, the width of the package may been from 1 to 2 cm, and the width of the chip may be 2 or 3 millimeters.

Figure 6:
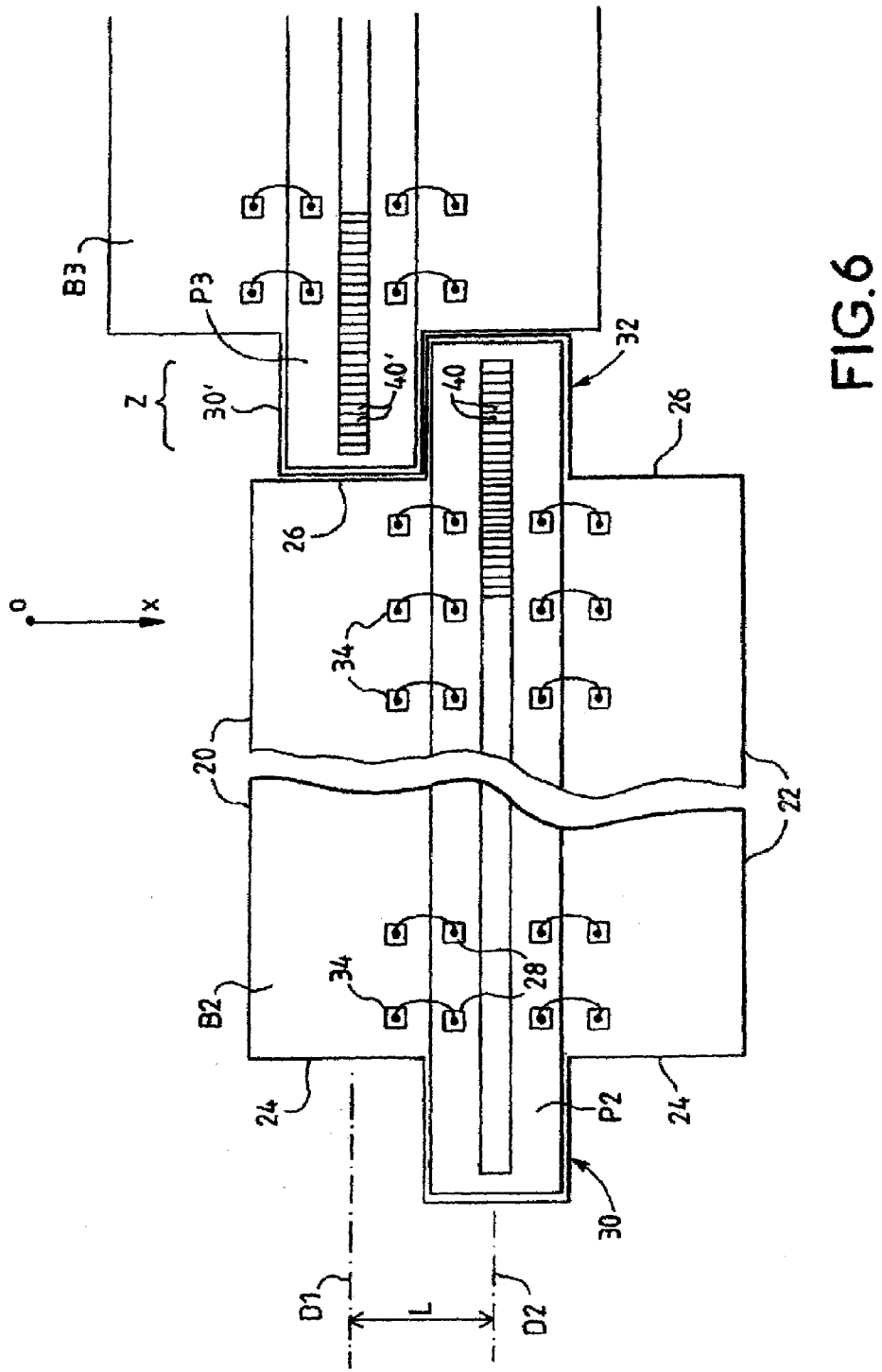
FIG. 6 represents a package according to the invention in more detail.

FIG. 6 shows in more detail a top view of an even rank package B2 abutting with an odd rank package B3.

The overall shape of the principal part of the upper surface of the package is an elongate rectangle, with two long sides 20 and 22 and two short sides 24 and 26, and the short sides are provided with two extensions 30 and 32, respectively on the left and right of the package, which extend parallel to the elongation direction of the rectangle.

The chip P2, in the form of a linear array, is electrically connected to the package B2 by connection wires joining terminals 28 of the chip to terminals 34 of the package. It is exclusively on the rectangular principal surface of the package, delimited by the long sides 20 and 22 and the short sides 24 and 26, that the electrical connection terminals 34 are located. There are no wire connection terminals on the extensions 30 and 32 which, as can be seen, are almost entirely covered by the chip. If absolutely necessary, it is feasible for there to be terminals 28 on the chip in the region of the extension, these wires leading to terminals 34 of the package in the principal zone.

The packages B2 and B3 abut via their respective extensions, the right extension 32 in the case of the package B2 and the left extension 30' in the case of the package B3: the left end of the extension 30' of the package B3 bears on the right short side 26 of the package B2 (or almost bears on it, if it is preferable that there should not completely be mechanical contact at this position); likewise, the extension 32 of the package B2 bears (or almost bears) against the left short side of the package B3; furthermore, in order to define the spacing between the lines of even rank and odd rank chips, the extensions 32 and 30' bear (or almost bear) against each other in the direction Ox via their lateral edges, which are perpendicular to the translation direction (edges parallel to the elongation direction of the arrays) and which face each other when the packages are put in place staggered.

The spacing L between the elongation axes of the arrays of photosensitive points of the two rows of chips is equal to the width of the extension, the chip being placed at the centre of the extension so that all the chip+package assemblies are identical. The width of the extension is equal to the width of the chip, to which may be added a positioning tolerance margin of a few tens of micrometers (preferably from about 50 micrometers to 200 micrometers, for example 50 or 100 micrometers) all around the chip. The margin at the end of the extension may be greater, so long as there are a sufficient number of photosensitive points in the extension in order to ensure overlap of the images taken by two adjacent chips.

FIG. 6 represents the zone Z in which the photosensitive points 40 and 40', belonging respectively to the chips P2 and P3, are in mutual overlap, that is to say they can see (albeit at different times) the same points of an image line translating in the direction Ox perpendicular to the lines of photosensitive points.

As mentioned above, each chip in the form of an elongate array may comprise one or several lines of photosensitive points 40. In particular, there are a plurality of lines in TDI type arrays.

Figure 7:
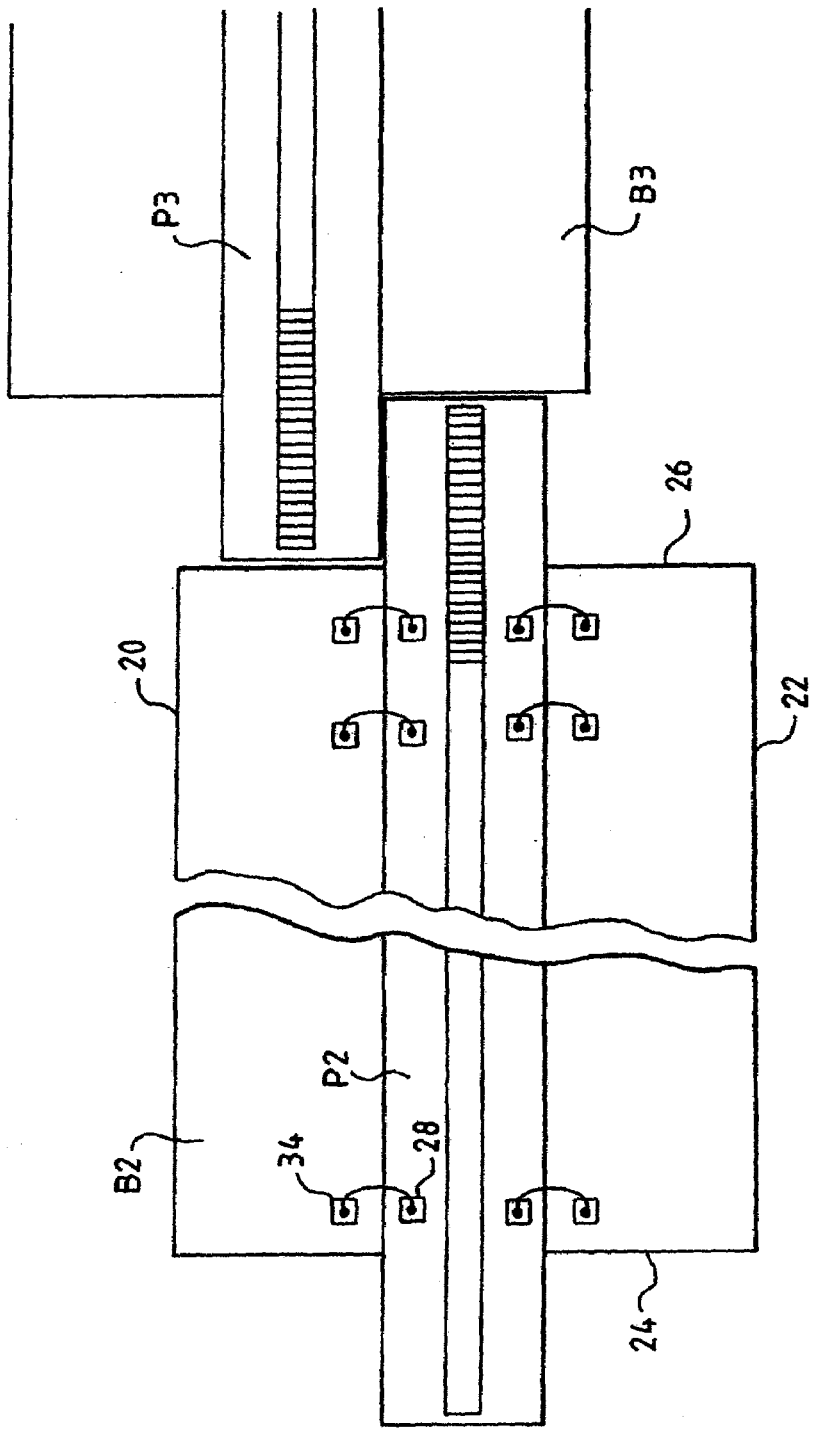
FIG. 7 represents an alternative embodiment with a rectangular package without extension and with a protruding chip.

FIG. 7 represents an alternative embodiment which is less beneficial than that of FIG. 6 owing to the greater sensitivity of the layout to shocks and vibrations and owing to the inferior thermal and electrical performances of the sensors. There is no lateral extension on the package in this variant, and the package is exactly rectangular with two long sides 20 and 22 and two short sides 24 and 26, although the chip protrudes laterally on the right and left of the package so that it is the chip itself which constitutes the extension used for abutment.

The staggered packages are abutted by making the chips touch via their protruding lateral edges. The end of one chip touches (or almost touches) a short side of the adjacent package, and a protruding lateral edge of the chip touches (or almost touches) a protruding lateral edge of the adjacent chip. The spacing between the axes of the line of even rank chips and the line of odd rank chips is in this case equal to the width of the chips. The image overlap is obtained via the protruding parts of the adjacent chips, which see the same points of an image line.

The invention is more particularly applicable to multilinear arrays (several lines of pixels) operating in TDI (Time Delay Integration) mode, in which the signals observed by a line are added to the signals observed by the preceding line in synchronism with the translation of the array; it is also particularly applicable to multispectral arrays in which several lines of pixels are provided, each line corresponding to a given color or spectral band; the invention is more generally applicable to high-resolution imaging, in particular for spatial imaging.

The invention claimed is:

1. A large-dimension image sensor operating by relative translation of the image with respect to the sensor, comprising:
a plurality of individual monolithic chips each capable of detecting a linear image portion perpendicular to the translation direction, the individual chips being arranged in a first group and a second two groups, the chips group being aligned the first group in order to detect aligned image portions and the chips of the second group being aligned in order to detect other image portions which are aligned but offset with respect to the chips of the first group in the relative translation direction, the chips of the second group being arranged in a staggered fashion with respect to the chips of the first group so that all the chips of the first group lie beside at least one chip of the second group, each of the chips being mounted on a package, connection wires being connected between connection terminals of the package and connection terminals on the upper surface of each of the chips, wherein the upper surface of the package, on which the chip is mounted, comprises a principal part the shape of which is an elongate rectangle whose length is less than the length of the chip and whose width is greater than that of the chip, all of the connection terminals of the package lying inside this rectangle along the chip, all the chips having two ends protruding from the rectangle, a protruding end of a chip being adjacent, via a side parallel to the row of chips, to a side likewise parallel to the row of chips of the protruding edge of another chip, the packages being identical and juxtaposed without reversal.

2. The image sensor as claimed in claim 1, wherein the package comprises two extensions adjacent to the rectangular principal part, this extension extending under the protruding chip part.

3. The image sensor as claimed in claim 2, wherein the extensions are slightly wider and longer than this protruding chip part under which they lie.

4. The image sensor as claimed in claim 3, wherein the width of the extension of the package is from about 50 micrometers to 200 micrometers more than the width of the chip.

5. An image sensor comprising a plurality of linear image detection arrays associated in order to form a linear image sensor with a length greater than that of each array, wherein the arrays are mounted on packages whose upper surface has an elongate rectangular shape provided on two opposite sides of the rectangle with two extensions substantially covered by the ends of the array, two packages being adjacent via a respective extension of each of them, no connection terminal being present on the packages in the region of the extensions, and the packages being identical and juxtaposed without reversal.

* * * * *